United States Patent [19]

Saajos

[11] 3,887,961
[45] June 10, 1975

[54] DAMPING ASSEMBLIES FOR DOORS OR THE LIKE

[76] Inventor: Jaakko Saajos, Virkkalantie 30 A, 08100 Lohja 10, Finland

[22] Filed: June 12, 1974

[21] Appl. No.: 478,708

[30] Foreign Application Priority Data
June 15, 1973 Finland.............................. 1947/73

[52] U.S. Cl........................................ 16/56; 16/51
[51] Int. Cl............................................... E05f 3/12
[58] Field of Search............... 16/49, 51, 52, 56, 82, 16/83, 84, 85, DIG. 9, DIG. 21, 66; 49/137

[56] References Cited
UNITED STATES PATENTS

| 1,115,539 | 11/1914 | Hoferle | 16/66 |
| 1,731,561 | 10/1929 | Campbell et al. | 16/52 X |
| 1,957,308 | 5/1934 | Anderson | 16/51 X |
| 2,091,904 | 8/1937 | Baumann | 16/51 |
| 3,137,888 | 6/1964 | Blom | 16/51 |
| 3,149,366 | 9/1964 | Martin | 16/51 |
| 3,255,482 | 6/1966 | Flint | 16/56 X |
| 3,408,683 | 11/1968 | Zahn | 16/51 |
| 3,574,886 | 4/1971 | Solovieff | 16/51 |
| 3,584,331 | 6/1971 | D'Hooge | 16/51 X |

Primary Examiner—Geo. V. Larkin
Attorney, Agent, or Firm—Steinberg & Blake

[57] ABSTRACT

A combination which has a movable component the movement of which must be at least partially damped. For this purpose a damping assembly is provided. The damping assembly includes a cylinder adapted to contain a damping fluid and a piston in the cylinder defining with opposed end walls of the cylinder a pair of chambers which communicate with each other through a passage outside of the cylinder. Thus, the piston and cylinder form a pair of members one of which moves with respect to the other along the cylinder axis while fluid is displaced through the passage between these chambers during this movement of the members one with respect to the other. A piston rod is connected to the piston and extends therefrom through one of the end walls of the cylinder while an extension rod is also connected with the piston and extends therefrom through the other of the end walls of the cylinder. This extension rod has a cross sectional area substantially the same as the cross sectional area of the piston rod so that in this way it becomes unnecessary to compensate for the lack of a piston rod in the cylinder chamber through which the extension rod passes.

9 Claims, 5 Drawing Figures

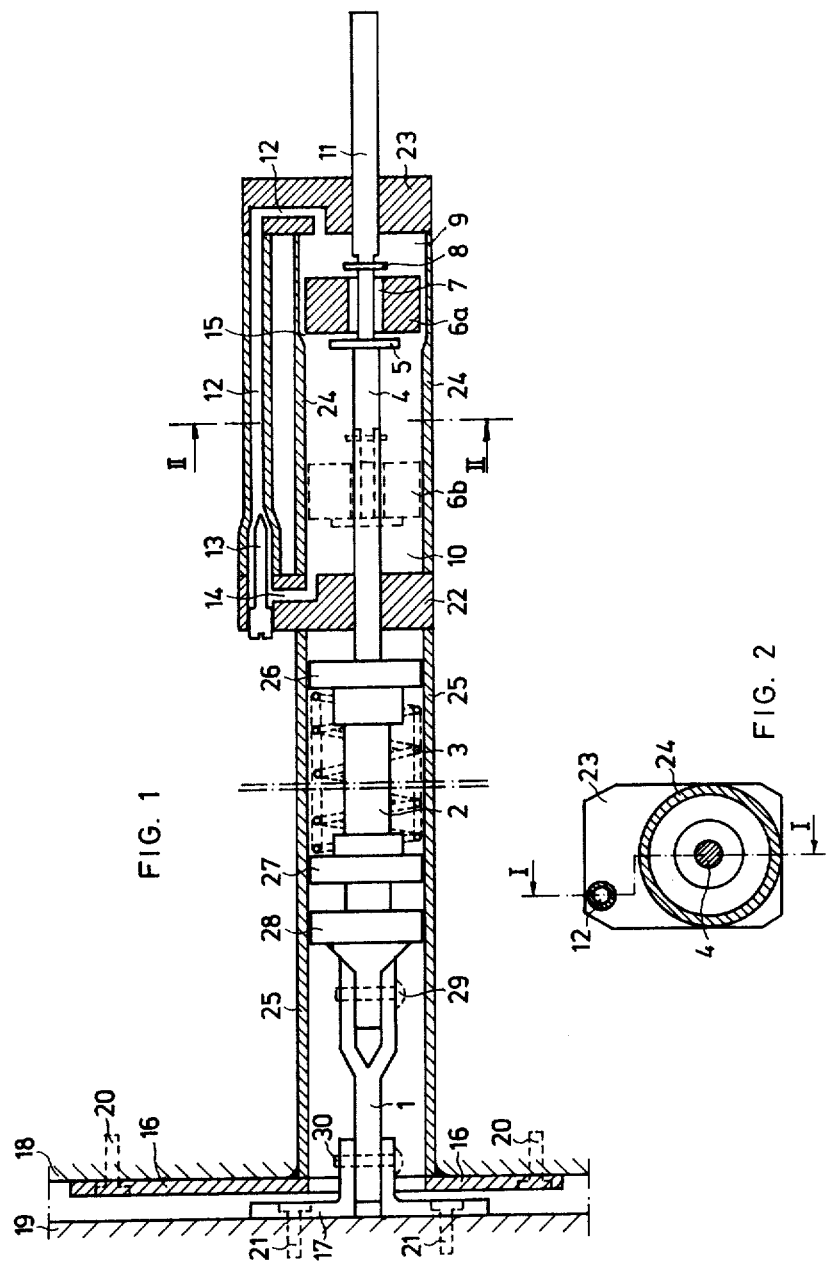

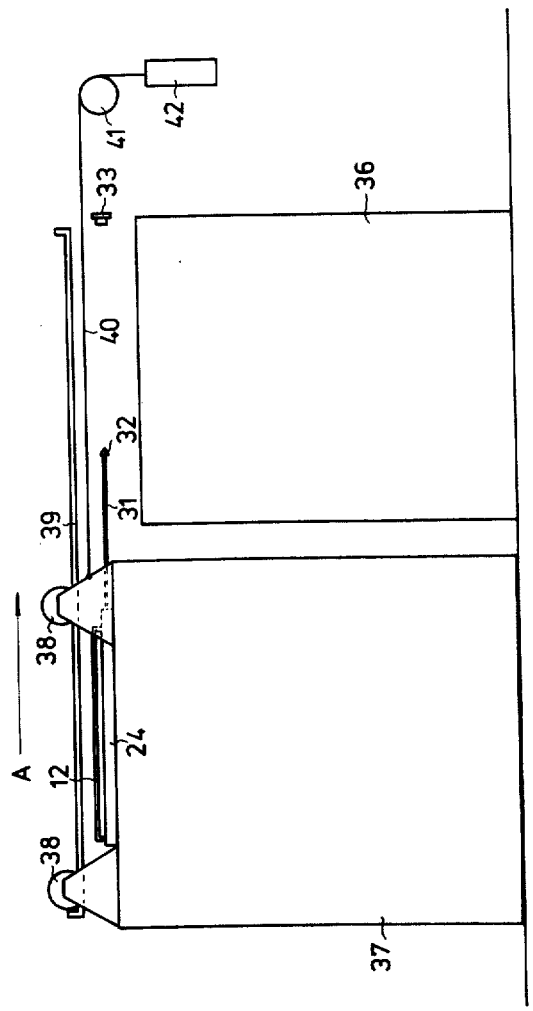
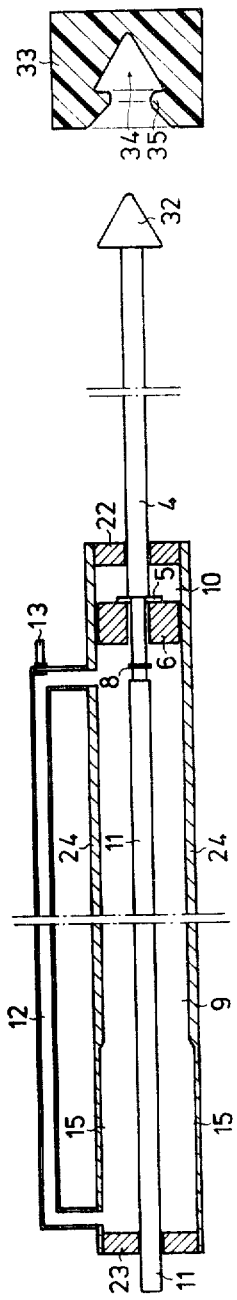
FIG. 3
FIG. 4
FIG. 5

DAMPING ASSEMBLIES FOR DOORS OR THE LIKE

BACKGROUND OF THE INVENTION

The present invention relates to damping assemblies and in particular to combinations which require a damping assembly for at least partially damping the movement of a movable componenet of the combination.

The present invention is particularly adapted for combinations where the movable component is a door the movement of which, in particular the closing movement, must be damped.

As is well known, damping assemblies of the above type include a cylinder which contains a damping fluid and a piston in the cylinder dividing the interior thereof into a pair of chambers respectively situated on opposite sides of the piston. During damping operation the piston and cylinder move one with respect to the other, and in order to damp the movement of a movable component the piston has a piston rod extending through an end wall of the cylinder and connected with a suitable structure for providing the damping movement by way of the relative movement between the cylinder and the piston.

With constructions of this type it is well known that on one side of the piston, the interior volume of the cylinder is partly occupied by the piston rod itself whereas on the other side of the piston there is no piston rod so that the interior volume of the cylinder is compeltely unobstructed across the interior of the cylinder. As a result when fluid is displaced between the chambers on opposite sides of the piston during the damping operation, it is necessary to compensate for the fact that there is no piston rod in one of the cylinder chambers.

It has already been proposed to bring about compensation of this type by way of a structure which maintains constant the interior volume of the damping cylinder which receives the damping liquid, in such a way that this volume which receives the damping liquid is maintained constant in all of the positions of the damping piston. It thus becomes possible through such a construction to compensate for changes in the volume which receive the damping liquid, these changes being brought about because of the presence of the piston rod on one side only of the piston.

In other words, because the piston rod is situated on only one side of the piston, the cylinder chamber in which the piston rod is located will require less liquid than the cylinder chamber on the other side of the piston because part of the volume on the piston rod side of the piston is occupied by the piston rod itself. It thus becomes possible with compensating structures of the above type to compensate for the lack of the piston rod on one side of the piston, but the drawback a construction of the above type is that it is relatively complex.

SUMMARY OF THE INVENTION

It is accordingly a primary object of the present invention to provide a damping assembly which will avoid the above drawbacks.

In particular, it is an object of the present invention to provide a damping assembly which will not require any compensating structure, particularly of the above relatively complex type, in order to compensate for the lack of a piston rod on one side of the piston.

Thus, it is an object of the invention to provide an exceedingly simple structure which will achieve a damping action with no requirement that compensating structure be provided because there is no piston rod on one side of the piston.

Furthermore, it is an object of the present invention to provide a damping assembly of the above general type which is particularly adapted for use with doors.

It is a special object of the present invention to provide a damping assembly of the above type which is used with fireproof doors.

In particular it is an object of the present invention to provide a damping assembly which can form part of a structure for automatically closing a door.

However, it is also an object of the present invention to provide a damping assembly which can be used with a door which has for closing the door a means, such as a counterweight, which is independent of the damping means.

According to the invention the damping assembly includes a cylinder adapted to contain a damping fluid and having a pair of opposed end walls between which a piston is located. A piston rod extends from the piston through one of the end walls. In accordance with the invention an extension rod is connected to and extends from the piston rod through the other of the end walls of the cylinder. This extension rod has the same cross-sectional area as the piston rod so that through this expedient a compensating structure as referred to above is no longer required. It is to be noted, however, that with the damping assembly according to the present invention the overall length of the assembly will be somewhat greater than the overall length of a construction of the type referred to above where a compensating means is provided to compensate for the lack of a piston rod on one side of the piston, so that where the extra length of the structure of the present invention is a disadvantage it may be preferred to still utilize the damping assembly which includes the compensating structure even though the latter has a relatively complex design.

BRIEF DESCRIPTION OF DRAWINGS

The invention is illustrated by way of example in the accompanying drawings which form part of this application and in which:

FIG. 1 is a fragmentary partly sectional longitudinal elevation schematically illustrating one possible embodiment of a damping assembly of the invention incorporated into a door-closing combination, the section of FIG. 1 being taken along line I—I of FIG. 2 in the direction of the arrows;

FIG. 2 is a transverse section of the structure of FIG. 1 taken along line II—II of FIG. 1 in the direction of the arrows;

FIG. 3 is a schematic illustration of the structure of the invention applied to a firedoor which is shiftable in its own plane;

FIG. 4 is a fragmentary longitudinal partly sectional elevation of the damping assembly incorporated into the combination of FIG. 3; and FIG. 5 is a sectional elevation of part of a releasable holding means which cooperates with structure shown in FIG. 4 and which forms part of the combination of FIG. 3.

DESCRIPTION OF PREFERRED EMBODIMENTS

Referring to FIG. 1, there is shown therein a door closer with a damping assembly forming part of the illustrated combination, the structure being shown in FIG. 1 in the closed position of the door. Thus, FIG. 1 fragmentarily illustrates a door 18 which fixedly carries an elongated hollow guide tube 25. This tube 25 is fixed at one end to a flange 16 which in turn is fixed by way of screws 20 to the door 18 so that in this way the structure shown in FIG. 1 is fixed directly with the door 18. The structure shown in FIG. 1 may be mounted on the door at any suitable location thereof with the flange 16 being formed with an opening coinciding with the hollow interior of the tube 25 as illustrated in FIG. 1. At its right end, as viewed in FIG. 1, the tube 25 carries the damping assembly of the present invention. The door 18 is movably mounted, for swinging movement, for example, in a fragmentarily illustrated door frame 19. The door frame 19 fixedly carries, by way of screws 21, a pair of angle members 17 which receive between themselves a swingable link 1 connected to the angle members 17 by way of a pivot 30. Thus, during opening and closing movement of the door the link 1 will swing around the axis of the pivot pin 30 which is carried by the angle members 17 which in turn are fixed to the door frame 19. In the closed position of the door which is illustrated in FIG. 1 the link 1 is received in the tube 25. Thus, the axis around which the door 18 swings during opening and closing movement has with respect to the axis provided by the pivot pin 30 a relationship according to which the link 1 becomes situated at least partly out of the tube 25, upon opening of the door, with the link 1 returning to the interior of the tube 25 when the door is closed.

The link 1 carries at its end distant from the pivot pin 30 a second pivot pin 29 which extends through an opening of an elongated actuating rod 2 so that the latter is pivotally connected by way of the pivot pin 29 with the end of the link 1 distant from the pivot pin 30. The elongated actuating rod 2 which extends coaxially along the interior of the tube 25 fixedly carries a flange 26 which is movable with respect to the tube 25 while the latter fixedly carries a flange 27 formed with an opening through which the actuating rod 2 freely passes so that the flange 27 surrounds the rod 2 while the latter is capable of moving axially through the flange 27. In addition the rod 2 fixedly carries a guide flange 28 which slidably engages the inner surface of the tube 25.

Between the flanges 26 and 27 which are respectively fixed to the actuating rod 2 and the tube 25 is located a spring means 3 which urges the door to its closed position. Thus the spring means 3 is in the form of a coil spring which is coiled about the rod 2 and compressed between the flanges 26 and 27 so as to urge the latter together with the tube 25 and the door 18 to the left, as viewed in FIG. 1 with respect to the flange 26, thus bringing about closing of the door. When the door is opened the flange 27 approaches the flange 26 and the compression of the spring 3 increases so that in the spring 3 there is stored in force which will close the door, the door being maintained open in opposition to the force of the spring 3 by any suitable latch structure which can be released to permit the spring 3 to expand and close the door.

The damping assembly which is shown in FIGS. 1 and 2 includes a cylinder 24 adapted to contain any suitable damping fluid such as oil, for example, this cylinder 24 having a pair of opposed end walls 22 and 23. The damping assembly includes a piston 6a which is situated in the interior of the cylinder 24 and which defines with the end walls 22 and 23 a pair of cylinder chambers 10 and 9, respectively, which are respectively situated on opposite sides of the piston 6a. A piston rod 4 is operatively connected with the piston 6a and extends therefrom through the cylinder chamber 10, fluid-tightly and slidably through the end wall 22. Beyond the end wall 22 the piston rod 4 is fixed to and forms an extension of the actuating rod 2. The piston 6a is shown in solid lines in FIG. 1 in the position it occupies when the door is closed. When the piston 6a assumes the position 6b shown in dotted lines, the door has been displaced to its open position. Thus during opening and closing movement of the door the piston 6a will move between the solid and dotted line positions in the cylinder 24 which is fixed to the door 18, by way of the tube 25, for movement with the door 18.

In accordance with the present invention an extension rod 11 is operatively connected with the piston 6a and extends therefrom through the cylinder chamber 9, slidably and fluid-tightly through the end wall 23 to the exterior of the cylinder 24. Thus this extension rod 11 occupies the chamber 9 whereas conventionally there would be no rod in the chamber 9. In accordance with the present invention the cross-sectional area of the extension rod 11 is substantially equal to the cross-sectional area of the piston rod 4. In the illustrated example the rods 4 and 11 are in the form of a one-piece body where these rods are coaxial, but it is also possible to make the rods 4 and 11 separate from each other and to connect them to each other and it is not essential that the rods 4 and 11 be coaxial or that they have identically shaped cross sections. It is only required that the cross-sectional areas of the rods 4 and 11 be equal so that it does not become necessary to compensate in the cylinder chamber 9 for the absence of a piston rod.

A passage means 12 provides communication between the cylinder chambers 9 and 10 in the manner illustrated in FIGS. 1 and 2. This passage means 12 includes a needle valve 13 which may be adjusted to control the rate of flow of damping fluid between the chambers 9 and 10. The part of the passage means 12 where the needle valve 13 is located communicates through a bore 14 with the chamber 10.

Furthermore it is to be noted that the piston 6a is situated between a pair of flanges 5 and 8 which form valve members for respectively closing opposite ends of a bore 7 through which part of the rod assembly 4, 11 passes with sufficient clearance to permit the damping fluid to flow through the bore 7 except when the latter is closed at one or the other of its ends by the flanges 5 and 8. The space between the flanges 5 and 8 is approximately 3 mm greater than the axial dimension of the piston 6a, so that this piston has a free movement on the order of 3 mm between these flanges 5 and 8.

Assuming that the door 18 is opened, then the body 25 together with the cylinder 24 will become displaced to the right, as viewed in FIG. 1, with respect to the piston rod 4 and extension rod 11, while the ring 27 approaches the flange 26 to compress the spring 3 between the flange 26 and the ring 27. Thus, since the link 1 has its distance from the frame 19 determined by the pivot pin 30, the piston rod 4 is in effect pulled to the left along the interior of the cylinder 24, as viewed in FIG. 1, displacing the piston 6a toward the dotted line position 6b thereof. However, the piston 6a which initially engages the flange 5 when the door is closed will remain stationary until the flange 8 engages the piston 6a, during the free movement of about 3 mm as referred to above, so that during this initial part of the opening movement the damping fluid will flow freely through the bore 7. Thus during this initial opening movement of the door the fluid will flow freely from the chamber 10 to the chamber 9. After the cylinder 24 has moved through approximately 3 mm to the right, as viewed in FIG. 1, along the piston rod 4, the piston 6a, which moves with the cylinder 24, actually remaining stationary during this time with respect thereto, engages the flange 8, so that now the relative movement between the piston rod 4 and the cylinder 24 will be transmitted to the piston 6b after this initial free movement during which the fluid flows through the bore 7.

During the movement of the cylinder 24 with respect to the piston rod 4, while the piston 6a approaches the position 6b, the combined total volume of the chambers 9 and 10 remains constant because of the presence of the extension rod 11. If the extension rod as described above were not present, then the combined total volume of the chambers 9 and 10 would increase during opening movement of the door, and additional fluid would be required to compensate for this increasing interior free space within the cylinder. When the piston reaches the position 6b, the door has been fully opened, and it may be maintained in this open position by any suitable releasable latch structure, for example, while the spring 3 is compressed and in a cocked position ready to close the door when the latch is released.

Thus, upon releasing of the door the spring 3 will expand to displace the flange or ring 27 away from the flange 26 and thus bring about closing of the door. This closing movement is brought about by way of the action of the actuating rod 2 and the link 1. Of course the piston rod 4 is fixed to forms an extension of the actuating rod 2, so that at this time the piston rod 4 together with the piston 6a are displaced to the right, as viewed in FIG. 1, toward the end wall 23 of the cylinder 24. However, since initially the flange 8 engages the right end of the piston, there is the above-described free movement on the order of 3 mm during the initial part of the closing movement, until the flange 5 engages the piston 6a to close the bore 7 and displace the piston 6a toward the wall 23. Thus during closing movement the actuating rod 2 pushes the rod 4 toward the end wall 23 of the cylinder. After the initial free motion through the distance of 3 mm as referred to above, the flange 5 acts as a valve to close the bore 7 and the damping fluid is now compelled to flow from the chamber 9 through the passage 12 and past the needle valve 13 and then through the bore 14 into the chamber 10. In this way the needle valve 13 controls the rate of flow of the damping fluid so that the speed of movement of the piston 6a with respect to the cylinder 24 is also adjusted, and in this way the rate of closing movement of the door is regulated. Thus with this damping action the damping fluid flows from the chamber 9 through the passage means 12 to the chamber 10 during closing of the door.

It will be noted that the cylinder 24 has at the region of the end wall 23 a wider portion 15 the diameter of which is larger than the remainder of the interior of the cylinder 24. Once the piston 6a has reached the wider portion 15 of the cylinder, the damping fluid can flow freely around the piston 6a directly from the chamber 9 to the chamber 10. The result is that when the piston 6a reaches the wider portion 15 there is a substantial drop in resistance to movement of the piston 6a. In this way there is a substantial drop in the damping force with the result that the spring 3 can suddenly expand for positively closing the door 18 during its final phase of movement with a suddenly increased speed or end jerk which will assure a positive closure of the door.

It is important for a door closer as described above, particularly when used as a door closer on a fireproof door of ships, as well as in other installations, that it be possible to use a long and powerful spring 3 so that the closer is capable of closing the door even when the ship is listing. Moreover, the final jerk or rapid positive closing movement of the door is exceedingly important particularly in the case of fireproof doors for ships. The reason for this is that fire ordinances require that fireproof doors of the above type on ships automatically close in an absolutely tight manner even under severe operating conditions. The complete closure of such a ship door is, furthermore, impeded by the fact that such doors commonly have three locks each of which is provided with a locking tongue which must be received in a cooperating lock member, and these three locks are usually situated at the upper, central, and lower part of each door so that there is a considerable force opposing the final stage of closing movement of the door. In addition, it is important that the door closer be mounted completely in the interior of the door so that it is fully invisible and out of the way of other functions. It will be noted that the structure of FIG. 1 of the present invention can readily be accommodated in a recess formed in the door itself, between the opposed faces of the door, so that in this way the structure lends itself to being completely enclosed within the door itself and thus being disposed out of the way where it will not interfere with the operation of other components.

FIGS. 3–5 illustrate a combination which includes the damping assembly of the invention, the particular combination of FIGS. 3–5 involving a fireproof door 37 which is guided for movement in its own plane, to the right in the direction of the arrow A shown in FIG. 3, from the illustrated open position to a closed position where it closes the door opening 36. A guide means is provided for the door 37 to guide the latter for movement in its own plane. In the illustrated example this guide means includes rollers 38 from which the door 37 is suspended, the rollers 38 being guided for movement along a suitable track 39 mounted on the wall which is formed with the door opening 36. Thus the rollers 38 can roll along the rail 39 while the door 37 is moved from the illustrated open position to its closed position closing the opening 36. This closing movement of the door 37 is brought about by a counterweight 42 which is suspended from one end of a wire or cable 40 guided around a pulley 41 freely turnable on the wall which is formed with the door opening 36. The door 36 can be maintained releasably in any suitable way in the illustrated open position. When a latch or the like which maintains the door 37 in its illustrated open position is released, the weight 42 will act on the door 37 to pull it in the direction of the arrow A of FIG. 3 so as to displace the door 37 to its closed position.

For reasons of safety, in order to avoid an excessive speed of the door during its final closing movement, the door 37 is provided with a damping assembly of the present invention, the damping cylinder 24 of the damping assembly being fixedly carried by the upper edge region of the door 37. The piston rod 4 of the damping assembly of the invention extends through the end wall 22 of the cylinder 24, as shown in FIG. 4, and this piston rod 4 has an elongated extension portion 31 indicated in FIG. 3 and terminating in a free end portion where an enlargement 32 of substantially conical configuration is situated. This enlargement 32 forms part of a releasable holding means which cooperates with the piston rod 4. For this purpose the wall which is formed with the door opening 36 fixedly carries a socket member 33 which also forms part of the releasable holding means. The socket member 33 is made of material which is yieldable and resilient such as rubber and the socket member 33 is formed in its interior with a recess 34 the configuration of which mates with the configuration of the enlargement 32. This recess 34 is partly limited by a shoulder 35 of the body 33, this shoulder 35 resiliently snapping behind the enlargement 32 in order to provide the releasable holding action. However, the inwardly directed lip which forms the shoulder 35 is yieldable so that it can be deformed to permit the enlargement 32 to be pulled out of the socket 33 in order to open the door.

As is apparent from FIG. 4, the structure of the illustrated damping assembly is substantially identical with that described above and shown in FIGS. 1 and 2. Thus, in the chamber 9 opposite from the chamber 10 in which the piston rod 4 is located there is an extension rod 11 which is fixed coaxially to and which has the same cross section as the piston rod 4, a passage means 12 being provided as illustrated in FIG. 4, with a needle valve 13 also being provided as shown. The socket member 33 is shown by itself in FIG. 5 but is positioned to receive the enlargement 32 as is apparent from FIG. 3.

Moreover, it will be noted that the cylinder 24 has at the region of the end wall 23 an enlarged or widened portion 15 of a somewhat greater interior diameter.

When with the embodiment of FIGS. 3–5 the counterweight 42 pulls the door 37 toward its closed position closing the door opening 36, there will be a relatively free unobstructed rapid movement of the door 37 until the latter approaches the final closing phase of movement. At this time the enlargement 32 will be received in the socket member 33, so that the movement of the piston rod 4 is terminated prior to the moment when the door 37 has reached its fully closed position. Thus the releasable holding means 32, 33, will serve at this time to hold the piston rod 4 stationary. This action of terminating the movement of the piston rod 4 takes place, for example, at a distance of approximately 500 mm before the final closed position of the door 37. The result of terminating the movement of the piston 4 in this way brings about an almost complete stop in the closing movement of the door. The reason for this is that at this time the piston 6 is situated in the position illustrated in FIG. 4 between the end wall 22 and the passage means 12. Therefore, when the releasable holding means 32, 33 initially acts on the rod 4 to stop the movement thereof, there is an extremely great resistance to flow of the damping fluid since it must flow through the very small gap between the piston 6 and the inner surface of the cylinder 24 at the region of the end wall 22. The result is that the above almost complete stop in the movement of the door takes place and the door is now compelled to move very slowly toward its closed position. However, once the right end of the passage means 12, as viewed in FIG. 4, has moved to the right beyond the piston 6, there will be a considerable drop in the resistance to closing movement of the door since now the fluid will flow from the chamber 9 to the chamber 10 through the passage means 12, with the needle valve 13 being adjusted to control the rate of flow of the fluid so that even though the resistance to movement of the door to its closed position is reduced nevertheless the closing door movement is braked in a controlled manner by adjustment of the needle valve 13.

However, once the widened interior portion 15 of the cylinder 24 reaches the piston 6, there will be a further reduction in the resistance to closing movement of the door since now the fluid can flow from the chamber 9 to the chamber 10 freely around the piston 6 itself, so that the final rapid closing movement referred to above is achieved also with the embodiment of FIGS. 3–5. The structure is designed so that the widened portion 15 reaches the piston 6 at approximately 100 mm before the complete closure of the door so as to achieve the final jerk or thrust which positively closes the door in order to insure that it will be positively locked.

When the door 37 is displaced to its open position the piston 6 will move away from the flange or valve 5 into engagement with the flange or valve 8 providing the free movement with flow through the enlarged bore of the piston 6 as referred to above, so that this free flow intially through the interior of the piston 6 itself will enable the initial movement of opening movement to take place very easily. However, the damped movement of the door will be provided in the reverse of the manner described above in connection with closing movement only until the end wall 22 of the piston 24 reaches the flange 5. At this time the cylinder 24 will be incapable of further movement with respect to the piston rod 4, so that now the enlargement 32 will be pulled out of the socket 33, and thus the further opening movement of the door will only be retarded by the weight of the element 42. At the same time the damping assembly is prepared for the next operation and the raising of the counterweight 42 stores therein the force required to close the door.

It will be noted that with the above-described damping assembly of the invention there is an assurance that no individuals will be injured by impact between the door 37 and the edge which defines the door opening 36 because of the delay in the final closing phase of the door achieved with the structure of the invention.

What is claimed is:

1. In a combination which includes a movable component whose movement must be at least partially damped, a damping assembly for at least partially damping the movement of said component, said damping assembly comprising a cylinder adapted to contain a damping fluid and having a pair of opposed end walls, a piston in said cylinder, said piston and cylinder forming a pair of members at least one of which is movable along the axis of said cylinder with respect to the other, said piston defining with said end walls a pair of interior cylinder chambers respectively situated on opposite sides of said piston, passage means operatively connected wtih said cylinder and providing communication between said chambers so that during movement of said one member along said axis with respect to the other the damping fluid can flow through said passage means between chambers, a piston rod operatively connected with said piston and extending slideably and fluid-tightly through one of said end walls, and an extension rod operatively connected to said piston and extending therefrom slideably and fluid-tightly through the other of said end walls, said extension rod having substantially the same cross section as said piston rod and said piston rod and extension rod forming a unit in which said piston rod and extension rod do not change their position relative to each other, said piston rod and extension rod respectively extending through said chambers and said extension rod rendering unnecessary any structure to compensate for the lack of a piston rod in that one of said chambers through which said extension rod passes.

2. The combination of claim 1 and wherein said piston rod and extension rod are coaxial.

3. The combination of claim 2 and wherein said piston rod and extension rod form a unitary, one-piece elongated body.

4. The combination of claim 1 and wherein said movable component is a door, an actuating rod fixed to and extending from said piston rod at the exterior of said cylinder, a flange carried by said actuating rod at the exterior of said cylinder, a second flange surrounding said actuating rod so that the latter is freely movable through said second flange, said second flange being fixed to said door, and spring means compressed between said flanges for acting thereon to close said door, whereby the closing movement of the door by said spring means will be damped by said damping assembly.

5. The combination of claim 1 and wherein said movable component is a fireproof door, guide means operatively connected with said door to guide the latter for movement substantially in its own plane from an open to a closed position, and said damping assembly being operatively connected with said door for damping the final phase in the closing movement thereof.

6. The combination of claim 5 and wherein said cylinder is carried by said door for movement therewith while said piston rod terminates beyond said cylinder in a free end portion, and releasable holding means cooperating with said free end portion of said piston rod for releasably holding the latter in a predetermined position when the door is closed and for locating said piston rod as well as said piston and said extension rod therewith in a given position with respect to said cylinder upon opening of the door.

7. The combination of claim 6 and wherein said releasable holding means includes an enlargement at said free end portion of said piston rod and a stationary socket member situated in the path of movement of said enlargement for receiving and releasably holding the latter when the door is closed.

8. The combination of claim 7 and wherein said enlargement is of a substantially conical configuration while said socket member has a substantially conical recess which mates with and receives said enlargement and which has a shoulder which retains said enlargement in said socket member.

9. The combination of claim 7 and wherein said cylinder is carried by an upper part of said door while said socket member is fixedly carried by a wall which is formed with an opening which is closed by said door.

* * * * *